United States Patent [19]

Kazaoka et al.

[11] Patent Number: 4,606,532

[45] Date of Patent: Aug. 19, 1986

[54] SEAT FOR VEHICLES

[75] Inventors: Kenichi Kazaoka, Nagoya; Hiroshi Okazaki, Toyota, both of Japan

[73] Assignee: Aisin Seiki Kabushiki Kaisha, Japan

[21] Appl. No.: 632,241

[22] Filed: Jul. 19, 1984

[30] Foreign Application Priority Data

Jul. 30, 1983 [JP] Japan ................. 58-140215

[51] Int. Cl.$^4$ .............................................. F16F 3/02
[52] U.S. Cl. .................. 267/102; 267/103; 297/452; 297/458
[58] Field of Search ............... 267/102, 103, 104, 105, 267/106, 107, 108, 109, 112; 297/452, 458, 459, 460

[56] References Cited

U.S. PATENT DOCUMENTS

| | | | |
|---|---|---|---|
| 1,901,720 | 3/1933 | Barwinkel | 267/110 |
| 2,629,430 | 2/1953 | Flint | 267/107 X |
| 2,659,417 | 11/1953 | Handren, Jr. | 267/107 X |
| 2,856,987 | 10/1958 | Lelli | 267/107 X |
| 2,934,133 | 4/1960 | Pawlikowski | 267/107 |
| 3,498,598 | 3/1970 | Rathburn | 267/103 |

FOREIGN PATENT DOCUMENTS

| | | | |
|---|---|---|---|
| 609567 | 11/1960 | Canada | 267/107 |
| 485637 | 10/1953 | Italy | 267/107 |
| 545890 | 7/1956 | Italy | 267/102 |
| 56-1093 | 1/1981 | Japan . | |
| 683676 | 12/1952 | United Kingdom | 267/109 |

*Primary Examiner*—George E. A. Halvosa
*Attorney, Agent, or Firm*—Finnegan, Henderson, Farabow, Garrett & Dunner

[57] ABSTRACT

An improvement in a seat for mounting on pairs of forward and rearward brackets in a vehicle. The seat includes a seat spring for supporting the seat cushion, a pair of connecting members for interconnecting the pairs of forward and rearward brackets, a rearward spring for connecting a rear portion of the seat spring to the rearward connecting member, and a forward spring for connecting a front portion of the seat spring and a rearward portion of the seat spring with the forward connecting member. The forward spring is pivotable and slidable on the forward connecting member.

7 Claims, 3 Drawing Figures

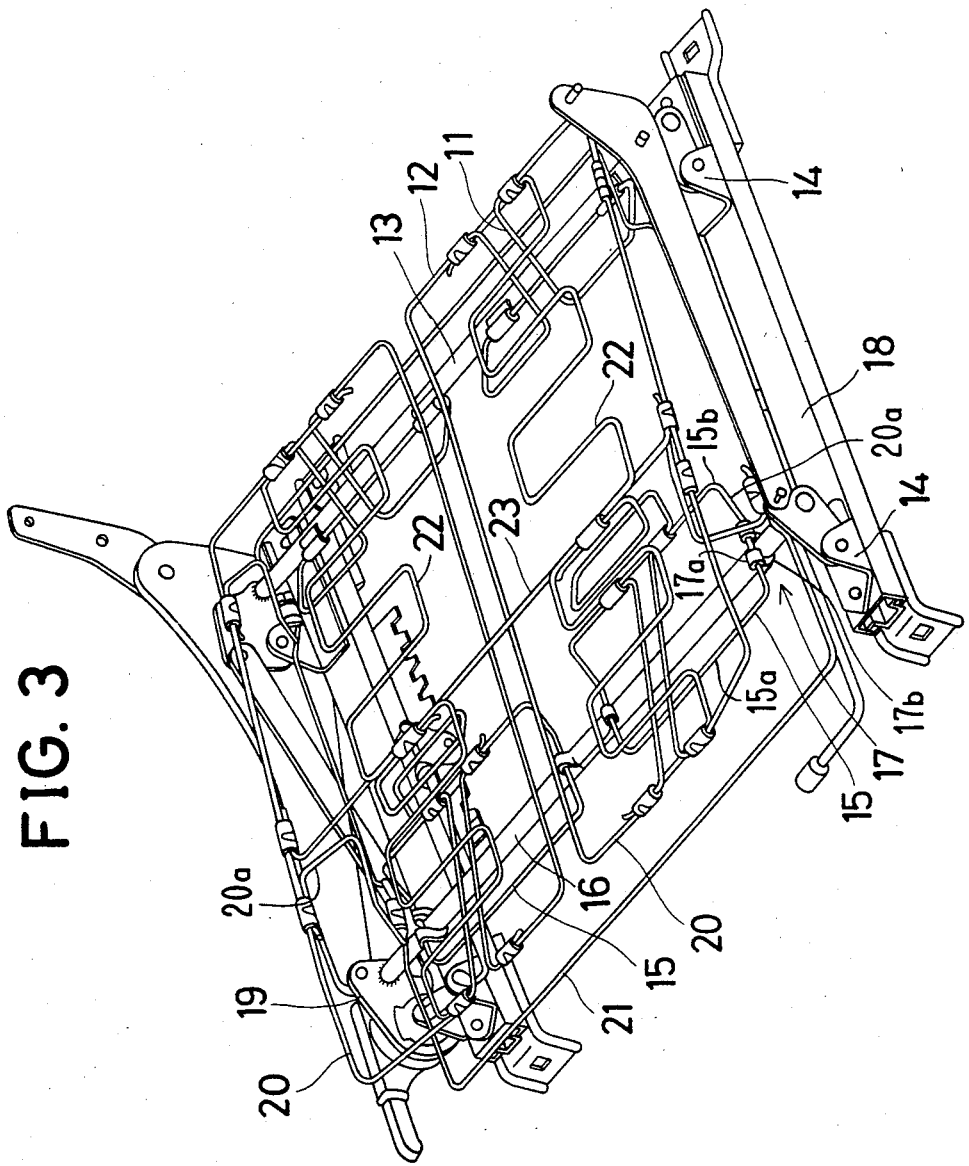

SEAT FOR VEHICLES

BACKGROUND OF THE INVENTION

1. Field of the Invention

The present invention relates to a seat, and more particularly to a seat for vehicles.

2. Description of the Prior Art

In a conventional seat such as in the Japanese patent publication No. 56(1981)-1093, a seat spring for supporting a seat cushion is connected to a lower frame or a seat cushion pan by utilizing forward and rearward springs. In such an arrangement, the center of gravity of the seated passenger normally is located farther rearwardly than the supporting center of the seat spring. Accordingly, the seated passenger tends to slide forwardly, and the forward spring of the seat is strengthened and hard material is used as the forward portion of the seat cushion in order to resist the weight of the seated passenger. This built-in resistance exists even if the seated passenger sits on a front portion of the seat.

When the seated passenger in the normal position on the conventional seat operates a pedal, such built-in resistance, acting against the femur of the passenger, tends to interfere with actuation of the pedal.

SUMMARY OF THE INVENTION

An object of the present invention is, therefore, to provide an improved seat for vehicles which obviates the aforementioned drawbacks of the described conventional seat.

A further object of the present invention is to provide an improved seat for vehicles which is relatively simple and includes a minimum number of parts.

To achieve the objects and in accordance with the purpose of the invention, the improvement in seat for vehicles of the invention includes a seat spring for supporting the seat cushion, a pair of forward and rearward connecting members for interconnecting pairs of support brackets for the seat, a rearward spring for connecting a rear portion of the seat spring and the rearward connecting member and a forward spring for connecting a front portion of the seat spring and a portion of the seat spring rearwardly therefrom with the forward connecting member, the forward spring being pivotable on the forward connecting member.

BRIEF DESCRIPTION OF THE DRAWINGS

Various other features, objects and attendant advantages of the present invention will become self-evident when considered in connection with the accompanying drawings wherein:

FIG. 3 is a perspective view of the seat spring and supporting springs of the invention incorporating a variation in the forward support spring.

DETAILED DESCRIPTION OF THE PREFERRED EMBODIMENT

Figure 1:
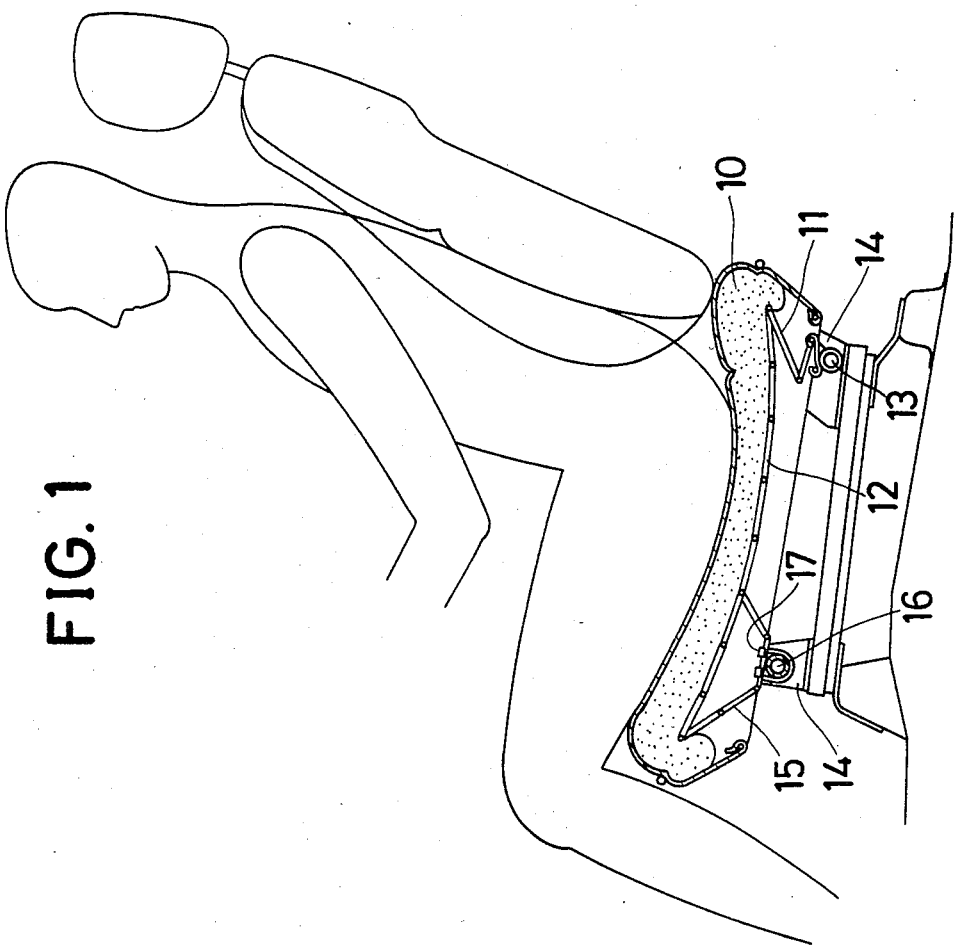
FIG. 1 is a lateral sectional view which shows a preferred embodiment of a seat for vehicles according to the present invention.

Referring now to FIG. 1, a seat cushion 10 is generally supported by a seat spring 12. A pair of aligned rearward springs 11 (only one being shown in FIG. 1) connect the rear portion of the seat spring 12 to a first, i.e., rearward, connecting member 13 (see also FIG. 3). The first connecting member 13 interconnects a pair of right and left brackets 14 slidably based on the floor of the vehicle, as known in the art. The rearward springs 11 are pivotably supported on the first connecting member 13.

A pair of aligned forward springs 15, (only one being shown) connects the forward portion of the seat spring 12 with a second, while a forward, cylindrically-shaped connecting member 16, also interconnects a pair of right and left brackets 14. Each forward spring 15 is supported on the second connecting member 16 by curling about a portion of the spring and the top ends 17a and pivoting arm 17b of a stopper 17 slidably and pivotably support each forward spring 15 on the second connecting member 10, as shown in FIG. 3. Accordingly, the forward springs are forwardly and rearwardly movable, i.e., slidably and pivotably through rocking of the stopper 17 on the second connecting member 16. The springs 15 have forward arms 15a extending forwardly of the second connecting member 16 and rearward arms 15b extending rearwardly of the second connecting member, both arms connecting with the seat spring 12.

Figure 2:
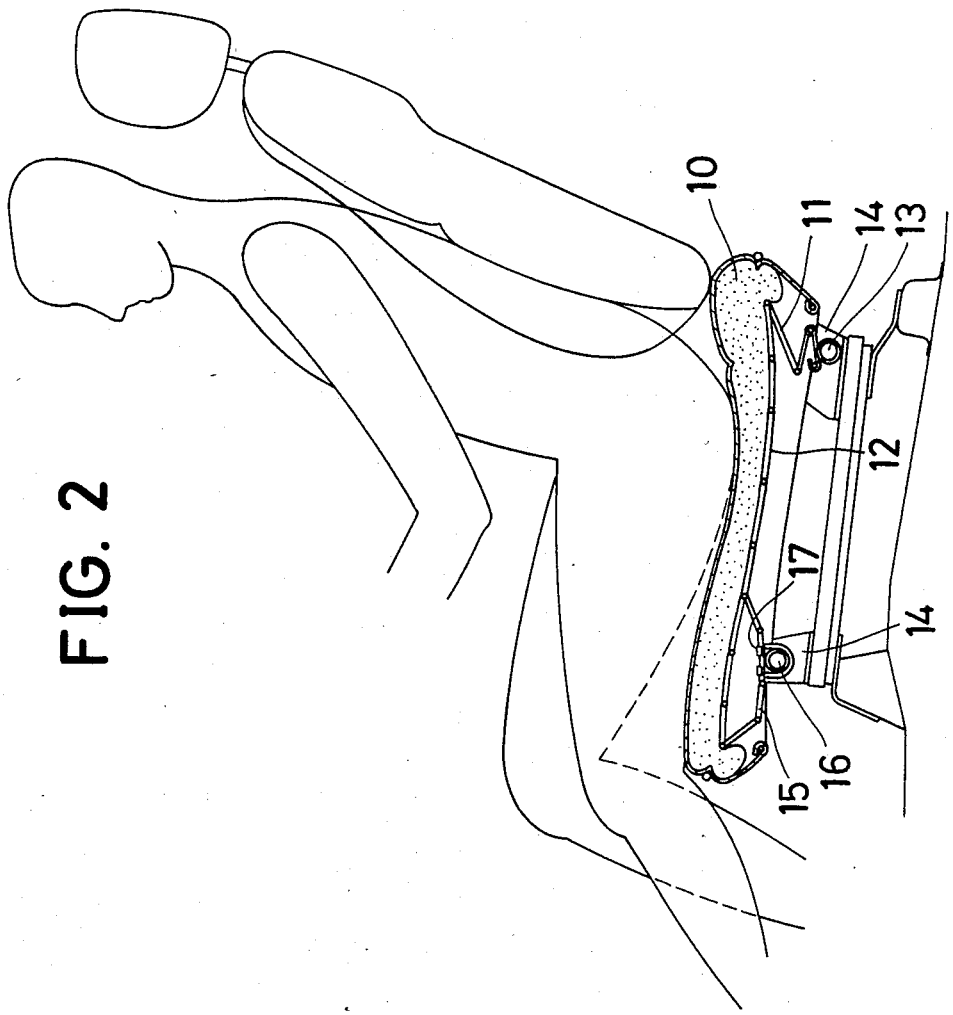
FIG. 2 is a view similar to FIG. 1, showing the state of the seat spring of FIG. 1 during operation of a pedal.

FIG. 2 shows the forward movement of the seat cushion 19, when the seated passenger operates a pedal. As clearly viewed from this figure, each forward spring 15 is rotated about the second connecting member 16 and at the same time the arms 15a and 15b tend to be forwardly and rearwardly extended and are, therefore, flexibly bent. The front portion of the seat cushion 10 is easily elastically transformed along the femur of the seated passenger and the resistance to the seated passenger is small. Accordingly, the operation of the pedal by the seated passenger is easy and the seat forms no problem in the driving operation.

FIG. 3 shows details of the structure of the seat of the invention and incorporates a variation in the forward springs 15 from that shown in FIG. 1. The brackets 14 are fixed to slides 18 and the seat is provided with an elevating apparatus 19, as known in the art.

The seat spring 12 includes a pair of upper spring frames 20 and a lower spring frame 21. The pair of upper spring frames 20 are aligned parallel to each other. Both upper spring frames 20 are connected to the lower spring frame 21 by resilient members 20a at the outer sides of the springs. The front and rear portions of each upper spring frame 20 are connected by springs 22 having the form of a linear series of S-shapes.

Each rearward spring 11 has a straight portion pivotably mounted to the rearward connecting member 13 from which the end portions of the spring incline forwardly and rearwardly and then inwardly parallel to the straight portion. The terminals of each spring 11 then turn rearwardly and upwardly parallel to clamped interconnections with rear portions of the frames 20.

In the embodiment of FIG. 3, each forward spring 15 has its ends clamped rigidly to the forward portion of the related upper spring frame 20. The adjoining spring portions of each forward spring 15 then inclines rearwardly and downwardly in parallel and then outwardly to connections with the ends of short S-shaped springs having their other ends clamped to the interrelated spring 22 and a connecting bar 23 described hereinafter. Portions of each spring 15 then extend farther outwardly from their connections to the short S-shaped spring, and then forwardly and slightly downwardly to a pair of pivotable connections with the forward connecting member 16. The springs 15 then extend forwardly and slightly upwardly to a central portion parallel to the forward connecting member, the central portion being supported only by the pivotable connections to the forward connecting member.

The forward springs 15, together with the portions of the upper spring frames 20 to which they are rigidly clamped, form substantially a reverse Z-shape, when viewed from the side, the rearwardly and downwardly inclined parallel portions of the forward springs forming the central portion of the reverse Z.

The forward springs 15 are rotatably mounted on the forward connecting member 16 by stoppers 17. The stoppers 17 are substantially U-shaped, the arms of the U extending upwardly around the connecting member 16 and the ends of the arms curling around the relevant portions of the forward springs 15. The stoppers 17 are therefore not only pivotably, but also slidably, mounted on the forward connecting member. Under the weight of a seated passenger, therefore, the forward springs 15 can slide forwardly relative the forward connecting member and return to their normal position when the weight is removed.

Each upper spring frame 20, spring 22 formed of linearly connected S-shapes and forward spring 15 and rearward spring 11 is made of a single piece of spring steel material. The outer sides of the pair of upper spring frames 20 are connected by a single connecting bar 23. The bar 23 is bowed slightly upwardly so as to pass above the inner sides of the upper spring frames 20 and does not interrupt the bending of the seat spring 12.

The upper spring frames 20 are separately assembled, so that when a seated passenger places his weight on one side, the upper spring frame 20 which receives the weight is bent considerably more than the other upper spring frame. The resistance to forward motion of the seated passenger is not applied by only one upper spring frame 20, so that the seat cushion 10 can be maintained more soft.

By the foregoing, there has been disclosed a preferred form of seat for vehicles constructed in accordance with the present invention. It will be appreciated that various additions, substitutions, modifications and omissions may be made thereto without departing from the spirit of the invention.

What is claimed is:

1. A seat mounted on forward and rearward pairs of brackets in a vehicle, having a seat cushion and comprising:
   a seat spring for supporting said seat cushion,
   a pair of forward and rearward connecting members for interconnecting said pairs of said forward and rearward brackets mounted on the lower side of said seat;
   a rearward spring pivotally connecting a rear portion of said seat spring to said rearward connecting member, and
   a forward spring pivotally connecting a first front portion of said seat spring and a second front portion of said seat spring, rearward of said first front portion, to said forward connecting member, said first front portion of said seat spring being forward of said forward connecting member and said second front portion of said seat spring extending substantially between said forward and rearward connecting members, said forward spring also including means for allowing slidable movement forward and rearward on said forward connecting member.

2. The seat of claim 1 further comprising two pairs of stoppers pivotably mounted on said forward connecting member, each pair of stoppers being slidably engaged with said forward spring at different sides of said spring.

3. The improvement of claim 1, wherein said seat spring includes a pair of parallel upper spring frames and a lower spring frame interconnected therewith.

4. The seat of claim 3, wherein said seat spring includes main springs and wherein front and rear portions of each of said parallel upper spring frames is connected by one of said main springs having serially connected S-shaped portions.

5. The seat of claim 4, wherein each of said parallel upper spring frames, said main springs, said forward springs, and said rearward springs are different single pieces of spring steel material.

6. The seat of claim 4, wherein said seat spring includes a connecting rod secured to opposite sides of said pair of parallel upper spring frames and wherein said connecting rod is attached to said main springs.

7. The improvement of claim 1 wherein said forward spring together with said front portion of the seat spring connected thereto have substantially a reverse Z-shape when viewed from the side.

* * * * *